United States Patent [19]

Buck et al.

[11] Patent Number: 4,663,094
[45] Date of Patent: May 5, 1987

[54] PROCESS FOR THE PRODUCTION OF A CUPOLA SHAPED PLASTIC PIECE WITH A FLAT RIM

[75] Inventors: Manfred Buck, Darmstadt; Friedrich Hanstein, Gross-Zimmern, both of Fed. Rep. of Germany

[73] Assignee: Roehm GmbH Chemische Fabrik, Darmstadt, Fed. Rep. of Germany

[21] Appl. No.: 830,498

[22] Filed: Feb. 20, 1986

Related U.S. Application Data

[63] Continuation of Ser. No. 713,700, Mar. 19, 1985, abandoned.

[30] Foreign Application Priority Data

Mar. 22, 1984 [DE] Fed. Rep. of Germany ....... 3410550

[51] Int. Cl.$^4$ .................. B29C 35/02; B29C 51/10
[52] U.S. Cl. ..................... 264/25; 264/292; 264/322; 264/522; 264/553
[58] Field of Search ................. 264/25, 522, 544, 292, 264/230, 322, 553

[56] References Cited

U.S. PATENT DOCUMENTS 3,608,016  9/1971  Holmstrom et al. ................ 264/522
4,139,586  2/1979  Gasson .............................. 264/522

*Primary Examiner*—Jan Silbaugh
*Assistant Examiner*—Hubert C. Lorin
*Attorney, Agent, or Firm*—Oblon, Fisher, Spivak, McClelland & Maier

[57] ABSTRACT

Cupola-shaped plastic pieces with a flat, unwarped rim can be produced from an equally large blank without trimming of the rim, by heating an optionally preheated plastic sheet by radiant heat. The radiant heat acts only on the area surrounded by the rim area until the area exposed to the radiant heat has reached a temperature just below the softening temperature of the plastic. Up to this point, the rim is left without tension, or at most a low clamping pressure is applied which allows a thermal movement of the rim. Then, but before the beginning of the forming, the clamping pressure is increased so that the rim is held tight. The radiation activity continues until the area exposed to the radiant heat has exceeded the softening temperature, the radiation activity is then stopped, and the area heated to the forming temperature is formed. The formed piece is then allowed to cool to just below the softening temperature, after which the clamping force acting on the rim is eliminated or so reduced that it allows contraction movements, and the cooling continues.

8 Claims, 1 Drawing Figure

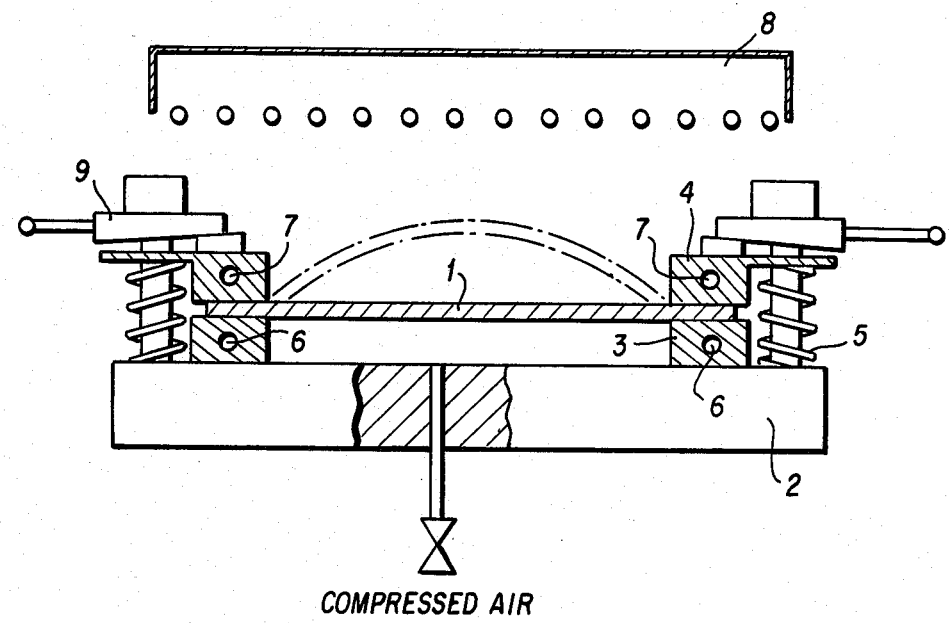
COMPRESSED AIR

PROCESS FOR THE PRODUCTION OF A CUPOLA SHAPED PLASTIC PIECE WITH A FLAT RIM

This application is a continuation of application Ser. No. 713,700, filed Mar. 19, 1985, now abandoned.

FIELD OF THE INVENTION

This invention relates to a process for the production of a cupola-shaped plastic piece with a flat rim by heating of a flat plastic sheet by radiant heat until the plastic sheet reaches a thermally softened condition, then forming the area surrounded by the rim of the sheet by mechanical or pneumatic pressure while the rim is held tight by a clamping pressure and is not formed, and then cooling the formed area.

BACKGROUND OF THE INVENTION

With the forming technique generally used for producing cupola-shaped plastic pieces, a totally flat plastic sheet is heated above its softening temperature by a radiant heater, the rim is clamped tight on a forming device, and the area surrounded by the rim is formed. After cooling of the shape, the rim clamping is released, and the shape is then removed from the forming device. See, e.g., the company publication of Imperial Chemical Industries Ltd. entitled "Acrylic Materials, Shaping by Heat Forming" (1960), at pages 12, 13, 64, and 65.

The foregoing technique has the disadvantage that the flat rim of the cooled shape is unevenly warped as a result of internal stresses. Consequently, as a rule the flat rim of the cooled shaped must be cut off. The internal stresses arise from the different conditions in different parts of the shape during the cooling phase. While the unclamped parts can thermally contract during cooling below the softening temperature, the tightly clamped rim area is prevented from doing so. Warping of the rim cannot be prevented by release of the clamping tool soon after the plastic has cooled to below its softening temperature. Even severe warpings occur in the rim area if the clamped sheet is heated in the forming device by radiant heat. However, the use of just such a production method is desirable because it involves little labor input.

OBJECTS OF THE INVENTION

With the foregoing in mind, it is a principal object of the invention to provide a process of the same general type in which heating of the plastic sheet is performed in the forming device itself, and a cupola-shaped plastic piece with a flat, unwarped rim is produced during a short processing time.

It is a further object of the present invention to provide such a process in which the subsequent trimming of the finished piece is eliminated.

SUMMARY OF THE INVENTION

The objects of the invention are achieved by a process in which radiant heat is made to act only on the area surrounded by the rim. The rim is left without stress (or, at most, a clamping pressure is applied to it which allows an expansion movement of the rim) until the area exposed to radiant heat reaches a temperature that is just under the softening temperature of the plastic. At this point or shortly after, but prior to the beginning of the forming, the clamping pressure is increased so that the rim is held tight. The radiation action continues until the area exposed to radiant heat has exceeded the softening temperature, after which the radiation action is stopped and that area, which has been heated to a forming temperature, is formed. The piece is then allowed to cool to just below the softening temperature, after which the clamping pressure acting on the rim is eliminated or so reduced that it allows thermal contraction movement during the remainder of the cooling of the piece.

Advantages and Industrial Application of the Invention

Plastic sheets can be used which already have the rim dimensions of the shape that is to be produced. The produced cupola-shaped plastic piece has a plane or only very slightly warped edge, which in general nowhere deviates more than 1 cm from the plane shape. Thus a subsequent trimming or cutting off of the rim is eliminated, so that the labor previously required to be expended for this purpose is saved and material loss is avoided. The flat, plane rim substantially facilitates watertight laying of the shape on a planar substructure.

The process of the invention is particularly suitable for producing light cupolas, such as those of low crown height, or similar shell-, tub-, or cupola-shaped plastic shapes with a flat rim.

BRIEF DESCRIPTION OF THE DRAWING

The single drawing is a schematic cross-sectional view illustrating the practice of the subject invention. In the drawing, the plastic sheet before forming is shown in solid line, and the plastic sheet after forming is shown in broken line.

DETAILED DESCRIPTION OF THE PRESENTLY PREFERRED EMBODIMENT

Planar plastic sheets of a thickness of, e.g., 1 to 12 mm and arbitrary length and width can be used. With rectangular blanks, the edge lengths are mostly between 300 and 3000 mm. However, larger or smaller sheets can also be processed. Round, elliptical, triangular, or other polygonal sheets can also be processed with suitable clamping tools.

Suitable plastic sheets can consist, for example, of polyvinyl chloride, cellulose esters, impact-resistant polystyrenes, and the like. Acrylic glass (in other words, cast or extruded poly(methyl methacrylate) or methyl methacrylate copolymers) and polycarbonate plastics, especially bisphenol A polycarbonate, are preferred. The plastics can be clear and colorless, white or color-frosted, opaque, or patterned on the surface. The upper surfaces can be smooth, frosted, or structured in any way. Transparent, smooth acrylic glass or polycarbonate sheets are preferably used.

A plastic sheet 1 can be placed cold in the forming device. However, if the sheet is preheated, the processing time can be shortened. The temperature of the plastic sheet 1 should be 10° C. or more below the softening temperature (glass temperature per DIN 7724). Therefore, if the plastic sheet 1 is made of acrylic glass, it should be preheated to not over 95° C., and, if the plastic sheet is made of polycarbonate, it should be preheated to not over 140° C.

The forming device includes a worktable 2 and a lower clamping frame 3 having a planar upper side fastened to the worktable 2. The plastic sheet 1 is placed on the upper side of the lower clamping frame 3. An upper clamping frame 4, which has a planar lower side, is placed on the rim of the plastic sheet 1.

Initially, the upper clamping frame 4 does not exert high clamping pressure. If the upper clamping frame 4 consists of square steel pipes, it can rest with its weight on the rim of the plastic sheet 1. In any case, the clamping pressure cannot be so high that the rim of the plastic sheet 1 is unable to move in response to the thermal expansion of the plastic sheet 1 during subsequent heating. If the upper clamping frame 4 is too heavy and hinders the thermal expansion of the plastic sheet 1, the upper clamping frame 4 can be lifted a little by springs 5. However, the clamping force exerted by the upper clamping frame 4 should be sufficient to suppress warping of the rim of the plastic sheet 1 during heating and to prevent a softened plastic sheet 1 from slipping out from between the lower clamping frame 3 and the upper clamping frame 4.

Use of heatable clamping frames 3, 4 is particularly advantageous. They can contain, e.g., electric strip heaters 5, 6, 7 on the inside. The lower clamping frame 3 and the upper clamping frame 4 are advantageously heated to a temperature of about 20°–50° below the softening temperature of the plastic sheet 1 -- e.g., to a temperature of about 55° C. to 85° C. for acrylic glass, and to a temperature of between 105° C. to 135° C. for polycarbonate. The temperature of the clamping frames 3, 4 can remain constant.

As soon as the upper clamping frame 4 is applied, a radiant heat source 8 can be turned on. As illustrated, the radiant heat source 8 acts on the area of the plastic sheet 1 within the upper clamping frame 4. Only when this area is heated throughout to a temperature close to the softening temperature of the plastic sheet 1 is the clamping force increased by a tightening means 9 so that the rim of the plastic sheet 1 no longer moves with further heating of the plastic sheet 1. The action of the radiant heat is continued until the softening temperature of the plastic sheet 1 is exceeded, and a temperature in the thermoplastic or thermoelastic forming range of the plastic sheet 1 is reached. According to experience, a favorable time for increasing the clamping force is after the lapse of two-thirds to three-quarters of the total period of action of the radiant heat until the forming temperature is reached.

After the plastic sheet 1 has reached the thermoplastic or thermoelastic stage, the plastic sheet 1 can be formed by the usual processes. It can be curved to a cupola contact-free by pneumatic high or low pressure, or it can be pressed in a hollow mold. Alternatively, mechanical molds can act on one or both sides.

The process of the invention is particularly suitable for producing shapes the greatest height of which is no more than half or three-fourths of the smallest planar dimension of the initial plastic sheet 1. Since the problem of rim warping occurs most severely with relatively flat shapes, production of shapes with the greatest height of no more than one-fourth of the smallest planar dimension is a particularly advantageous embodiment of the invention.

The radiant heat as a rule is cut off before forming. However, the radiant heat also may be cut off during or after forming. After forming, the formed area is kept under the forming force until it cools to just below the softening temperature. At that point, clamping forces are again reduced so as to permit thermal contraction movement of the plastic shape. At this stage, the upper clamping frame 4 can be removed, and the shape can be removed and cooled completely outside the forming device—preferably on a planar, slightly heat conductive support made, for example, of wood.

The unhampered thermal expandability of the plastic sheet 1 during the heating period and the unhampered thermal contractability of the plastic shape during the cooling period are decisive for the success of the process. If the expansion and contraction movements are prevented by a tight clamping of the rim, stresses occur in a transition area between the rim and the formed area which lead to warping of the rim area. These stresses are greater the wider the temperature range through which the area to be shaped passes while the rim is clamped tight. Therefore, an effort is made to keep this range as small as possible. It is smallest when the clamping means 9 is applied tightly only immediately before forming. This of course implies that the clamping means 9 should not be applied until after the forming temperature has been reached. However, if there is a danger that the plastic sheet 1 will pull out from between the clamping frames 3, 4 under its own weight after softening, the clamping force is increased shortly before the softening temperature is reached. This can occur in the range of up to about 10° C. below the softening temperature. If the clamping force is increased too soon, increasing warpings of the rim will have to be expected.

During cooling the high clamping force must be maintained at least until the shape has cooled below its softening temperature. However, the high clamping force must be eliminated or reduced before the formed area is cooled more than about 20° C. below the softening temperature.

Undesirable stresses are further caused by the temperature difference between the formed area and the clamped rim area. Shapes with particularly few stresses are obtained if a preheated sheet is placed between preheated clamping frames of about the same temperature. This step at the same time shortens the processing time in the forming device.

What is claimed as new and desired to be secured by Letters Patent of the United States is:

1. A process for the production of a cupola-shaped plastic piece having a flat rim from flat plastic sheet the thickness of which is in the range of 1 to 12 mm, said process comprising the steps of:
    (a) while the flat plastic sheet is at a temperature $T_1$ 10° C. or more beneath its softening temperature, holding the rim of the flat plastic sheet in a fashion which permits the flat plastic sheet to move in the plane of the sheet in response to thermal expansion but which does not permit the rim of the flat plastic sheet to warp out of the plane of the sheet; then
    (b) heating the exposed central area of the flat plastic sheet but not the rim surrounding the exposed central area of the flat plastic sheet until the softening temperature of the plastic in the exposed central area of the flat plastic sheet is exceeded;
    (c) applying a tight clamping pressure to the rim of the flat plastic sheet when the exposed central area of the flat sheet has reached a temperature $T_2$ above 10° C. below the softening temperature of the flat plastic sheet and below the softening temperature of the flat plastic sheet; then, after both step (b) and step (c) have been completed,
    (d) forming the exposed central area of the flat plastic sheet into the shape of a cupola while the exposed central area of the flat plastic sheet is above the softening temperature of the flat plastic sheet and while maintaining the tight clamping pressure on the rim of the flat plastic sheet; then (e) permitting the formed shape to cool a temperature that is beneath the softening temperature of the flat plastic sheet and above 10° C. below the softening temperature of the flat plastic sheet; then (f) releasing the tight clamping pressure from the rim of the formed shape; and then (g) permitting the formed shape to cool to ambient temperature.

2. A process as recited in claim 1 wherein step (c) is effected when the exposed central area of the flat plastic sheet has reached a temperature just below the softening temperature of the flat plastic sheet.

3. A process as recited in claim 1 wherein step (c) is effected when the exposed central area of the flat plastic sheet has reached a temperature above the softening temperature of the flat plastic sheet.

4. A process as recited in claim 1 and comprising the further step of pre-heating the flat plastic sheet to a temperature that is more than 10° C. below the softening temperature of the flat plastic sheet before step (a).

5. A process as recited in claim 1 wherein the flat plastic sheet is held in clamping tools which are heated to a temperature of between 20° C. and 50° C. below the softening temperature of the flat plastic sheet.

6. A process as recited in claim 1 wherein the heating step is accomplished by heat radiation.

7. A process as recited in claim 1 wherein step (c) occurs between two-thirds and three-quarters of the time between the beginning of step (a) and the beginning of step (d).

8. A process as recited in claim 1 wherein step (d) causes formation of a formed shape the greatest height of which is no more than one-fourth of the smallest planar dimension of the exposed central area of the flat plastic sheet.

* * * * *